US008024756B2

(12) United States Patent  
Friedlander et al.

(10) Patent No.: US 8,024,756 B2
(45) Date of Patent: Sep. 20, 2011

(54) TV USER INTERFACE FOR VIEWING SELECTED SUB-GROUPS OF CHANNELS

(75) Inventors: Steven Friedlander, San Diego, CA (US); Tracy Ho, San Diego, CA (US); Yuko Nishikawa, La Jolla, CA (US); Sabrina Yeh, Laguna Beach, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 444 days.

(21) Appl. No.: 12/100,676

(22) Filed: Apr. 10, 2008

(65) Prior Publication Data

US 2009/0260034 A1    Oct. 15, 2009

(51) Int. Cl.
G06F 3/00    (2006.01)
G06F 13/00   (2006.01)
H04N 5/445   (2011.01)

(52) U.S. Cl. ............ 725/52; 725/44; 715/716; 715/782; 715/851

(58) Field of Classification Search .................. None
See application file for complete search history.

(56) References Cited

U.S. PATENT DOCUMENTS

| 5,323,240 | A | * | 6/1994 | Amano et al. ................ 348/731 |
| 5,589,892 | A | * | 12/1996 | Knee et al. ....................... 725/43 |
| 6,177,931 | B1 | * | 1/2001 | Alexander et al. ............... 725/52 |
| 6,822,662 | B1 | * | 11/2004 | Cook et al. ..................... 715/788 |
| 7,480,873 | B2 | * | 1/2009 | Kawahara ...................... 715/848 |
| 2002/0194599 | A1 | | 12/2002 | Mountain |
| 2003/0110495 | A1 | | 6/2003 | Bennington et al. |
| 2005/0240965 | A1 | | 10/2005 | Watson et al. |
| 2006/0031876 | A1 | * | 2/2006 | Ok et al. ........................... 725/39 |
| 2007/0011702 | A1 | | 1/2007 | Vaysman |
| 2008/0148317 | A1 | * | 6/2008 | Opaluch .......................... 725/46 |
| 2008/0222552 | A1 | * | 9/2008 | Batarseh et al. ............... 715/776 |
| 2009/0217187 | A1 | * | 8/2009 | Kendall et al. ................. 715/765 |

FOREIGN PATENT DOCUMENTS

EP            1686796       2/2006
WO    WO 2006051512 A2 *  5/2006

* cited by examiner

Primary Examiner — Andrew Koenig
Assistant Examiner — Jason J Chung
(74) Attorney, Agent, or Firm — John L. Rogitz

(57) ABSTRACT

Intuitive user interfaces are disclosed for a TV showing a favorites channel pane that can transition to a channel history pane, etc. in response to remote control commands.

9 Claims, 4 Drawing Sheets

TV USER INTERFACE FOR VIEWING SELECTED SUB-GROUPS OF CHANNELS

FIELD OF THE INVENTION

The present invention relates generally to user interfaces for TVs that allow a user to view selected sub-groups of channels.

BACKGROUND OF THE INVENTION

Televisions have become increasingly advanced, providing viewers with ever more control and viewing options. As but one example, electronic program guides (EPG) can be displayed on a TV in response to a command generated by a remote control device, with the EPG showing a channel listing and show descriptions.

Additional TV features and functions may also be provided, and as understood herein, many if not most of these features and functions entail presenting a user interface on screen to enable a viewer to select or control the feature or function. As also understood herein, owing to the growing number of such features and functions and the operational complexity that can attend to managing them, the user interfaces preferably are displayed in an intuitive, easy to understand format that keeps screen clutter and, hence, viewer confusion to a minimum.

SUMMARY OF THE INVENTION

A TV system includes a TV display and processor that executes logic to present user interfaces (UI) on the display. A first UI is presented next to a pane presenting video from a currently tuned-to channel. The first UI presents a list of only a subset of available channels, with the first UI including at least one selector selectable to cause a second UI to appear next to the pane.

In some implementations the list includes channel number and program description. Channels in the list can be presented in a single column for only one time slot. The list can be a viewer-defined favorite channel list, or a history channel list showing the most recent "N" channels tuned to for longer than a predetermined period. Indeed, the list can be a favorite channel list defined by a viewer and the second UI can include a history channel list showing the most recent "N" channels tuned to for longer than a predetermined period.

Yet again, on some UIs the list of the first UI may present all channels available to the TV for only one time slot. In this case, the second UI can be an EPG showing program information for at least two time slots.

If desired, the first UI can be depicted to graphically swing back and then forward to a front view showing the second UI.

In another aspect, a method includes displaying a current channel on a TV monitor and displaying a first user interface (UI) on the monitor next to the current channel. The method also includes receiving a signal from a remote control device to change to a second UI. Further, the method can includes using motion graphics to transition from the first UI to the second UI.

In yet another aspect, a system includes a processor, a TV display communicating with the processor, and means accessible to the processor to display a current channel pane on the display showing video from a tuned-to channel from a set of available channels. The means also permit the processor to display a first UI next to the current channel pane showing a scrollable list of only a subset of the available channels, with the first UI showing program information for only a single time slot.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
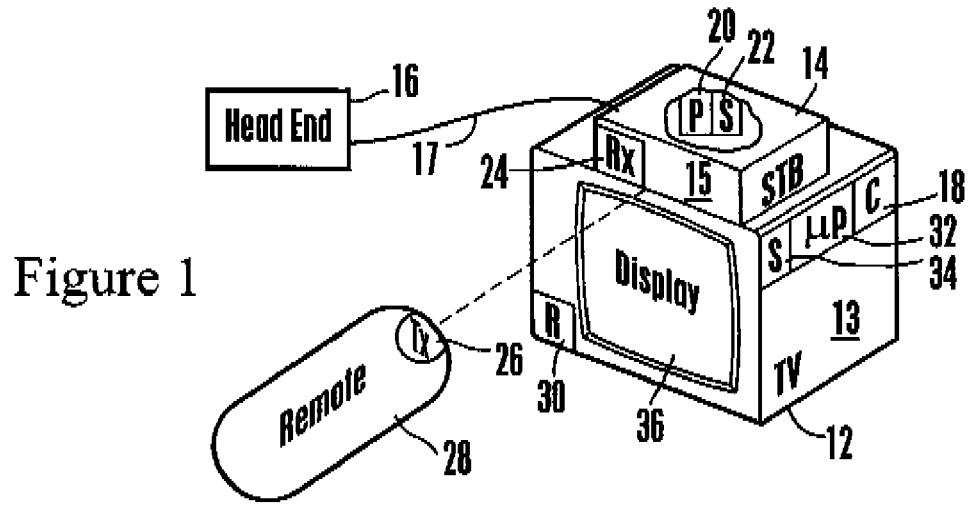
FIG. 1 is a non-limiting hardware block diagram of a system in accordance with present principles, with portions of the STB and TV cut away for clarity.

Referring initially to FIG. 1, a system is shown, generally designated 10, which includes a television 12 defining a TV chassis 13 and receiving, via a set-top box (STB) 14 defining a STB housing 15, audio video TV programming from a head-end 16, such as a cable or satellite head-end, over a wired or wireless link 17. The STB 14 and TV 12 are examples of receivers. "Set-top box" also includes set-back boxes. While the STB 14 is shown separately housed from the chassis 18 of the TV 12, it is to be understood that the functionality of the STB 14 may be incorporated into the chassis 18.

As shown, the STB 14 includes a STB processor 20 and a tangible computer readable medium 22 such as volatile or non-volatile solid state storage, disk storage, tape storage, or other type of electronic storage medium or logic circuitry that typically can be executed by the processor 20. The STB 14 typically includes a wireless receiver such as an infrared (IR) receiver 24 for receiving channel, volume, and other commands from a hand-held wireless transceiver 26 on a TV remote control 28. The receiver 24 communicates with the STB processor 20. Likewise, a TV wireless receiver 30 may be provided on the TV housing and may communicate with the TV processor discussed below for sending commands from the remote control 28 to the TV processor.

Additionally, as shown the TV 12 typically includes a TV processor 32 and tangible computer readable medium 34. Video as well as the below-described user interfaces may be presented on a display 36 of the TV 12, e.g., a flat panel matrix display, cathode ray tube, or other appropriate video display.

Either one or both of the above-described processors may execute instructions stored in either one or both of the above-described tangible computer readable media to present the user interfaces described further below in response to commands received from, e.g., the remote control 28. The tangible computer readable media may be established by, without limitation, solid state storage, optical or hard disk storage, tape storage, etc.

Figure 2:
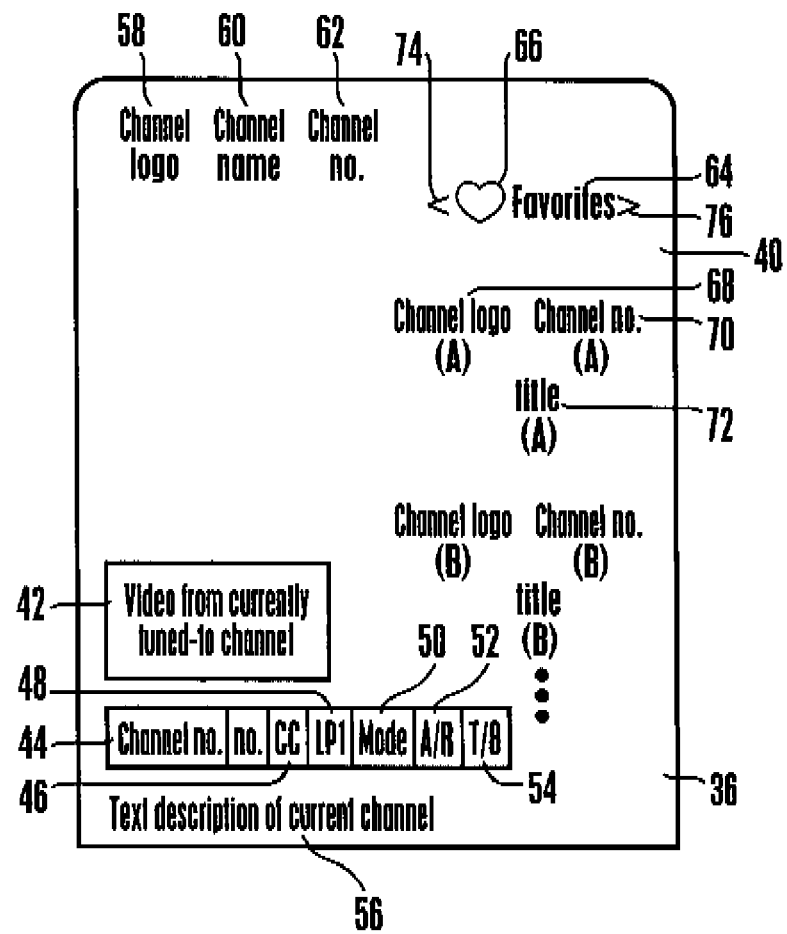
FIG. 2 is a screen shot of a user interface showing a viewer-defined "favorites" subset of channels juxtaposed with a video pane showing video from a currently tuned-to channel.

Now referring to FIG. 2, a first screen shot is shown of a user interface (UI) 40 that can be presented on the display 36 in response to, e.g., a viewer manipulating a key such as a "menu" key on the remote control 28. As shown, a current channel video pane 42 may be presented that presents video from the channel currently tuned to. Along with the video from the current channel, several related alpha-numeric indicators may be provided below the pane 42. These indicators may include a channel number indicator 44, indicating the channel number of the current channel, and an indicator 46 indicating whether the channel is displaying or may display closed captioning. Also, a line-per-inch indicator 48 may be provided indicating the number of horizontal lines per inch associated with the current channel video, and likewise a mode indicator 50 can be provided indicating the video mode, e.g., high definition, of the video associated with the current channel. Moreover, an aspect ratio indicator 52 may indicate the aspect ratio (e.g., 16:9) of the video of the current channel, and a time remaining indicator 54 can indicate the time remaining of the current program. A text description 56 of the current program may also be provided below the indicators 44-54.

In addition to the above information associated with the currently tuned-to channel, a logo 58 associated with the current channel may be presented above the current channel pane 42 as shown, and next to it the name 60 of the channel, typically a three or four letter call sign. The number (shown at 62) of the current channel may also be repeated above the current channel pane 42 as shown. The elements 42-62 may be the same for the various UI shown in FIGS. 2-6 and 8.

Now turning to the UI 40, as shown the UI 40 is a list of channels in a subset of the channels available in the current time slot to the TV, in the case shown for FIG. 2, a "favorite" channel list that is established by a viewer or viewers. It is to be understood that the UI 40, like the other UIs discussed herein, may be delineated by a border as shown for the current channel pane 42 but need not have a precisely defined border as shown in FIG. 2.

The "favorite" channel list can be defined by a viewer in an appropriate non-limiting way, such as by accessing an "add to favorites" menu and then selecting channels from the list to be added to a "favorites" channel data structure.

As shown, at the top of the UI 40 a title 64 of the subset is shown, in the case shown for FIG. 2, "favorites". Next to the title 64 may be a list icon 66. In the example shown, the list icon 66 is a heart. As discussed further below, for different channel subset UIs, associated titles with icons can be displayed and the titles and icon of one UI are different from those of any other UI.

The channels for the current time slot in the "favorites" subset of channels are indicated in a single column below the title and icon. In the example shown, the first channel ("A") is listed by channel icon 68 and channel number 70, along with, if desired, the title 72 of the program currently being shown on channel "A". The same information is shown for additional channels in the UI 40 (e.g., for channel "B" and so on), and a viewer may manipulate the remote control 28 to hover a screen cursor over a channel or scroll through the list to cause additional channels in "favorites" (but not otherwise available channels that are not in the favorites list) to be presented in the UI 40. By placing the cursor over a desired channel and pressing an "enter" key or other appropriate key on the remote control 28, the viewer can cause the TV to immediately tune to the selected channel. If the currently tuned-to channel in the current channel pane 42 is in the subset of channels in the UI 40, it may be highlighted as it appears in the UI to so indicate.

At least one and preferably two UI selectors 74, 76 may be presented in the UI 40 as shown and in one implementation are juxtaposed with the UI title 64. In the embodiment shown, the selectors 74, 76 are left and right arrows, although other images (such as up and down arrows) can be used.

Figure 3:
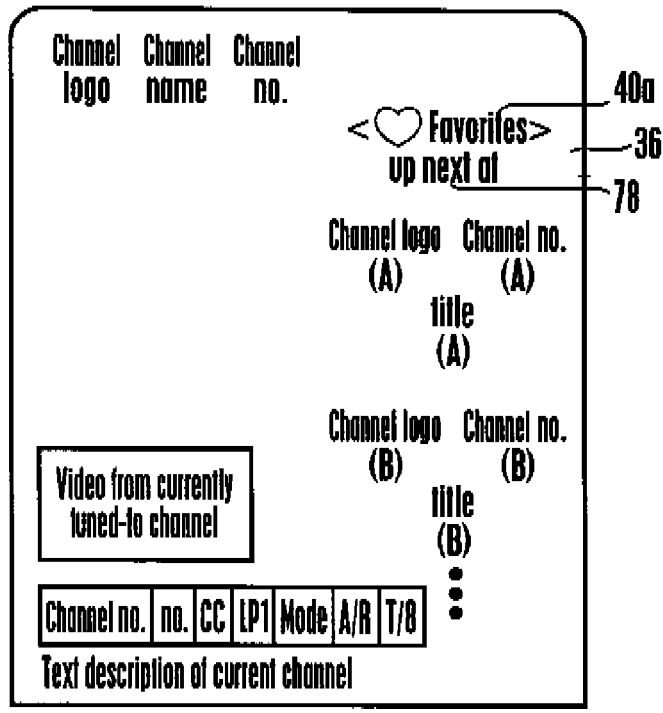
FIG. 3 is a screen shot of a user interface showing the "up next" feature in the context of the "favorites" subset of channels.

Using the remote control 28, a viewer may select, e.g., the right arrow selector 76 to alter the information presented in the UI. As one example, FIG. 3 shows that in response to selecting the right arrow 76, the UI 40 is replaced by a UI 40a that in all essential respects may be identical to the UI 40 except that the UI 40a in FIG. 3 shows the favorite channel information for the next time slot. Accordingly, the UI 40a can indicate, at 78, that the information being displayed is for the programs that are up next on the favorite channels. In any case, each UI 40, 40a shows channels for only one respective time slot, e.g., current or next. Preferably, the transition from the "current" UI 40 of FIG. 2 to the "up next" UI 40a of FIG. 3 may be graphically effected by causing the "current" list in the UI 40 to move left, disappearing as the "up next" list of the UI 40a moves into view from the right. Similar "up next" versions of the history and channel UIs discussed below may be provided.

Figure 4:
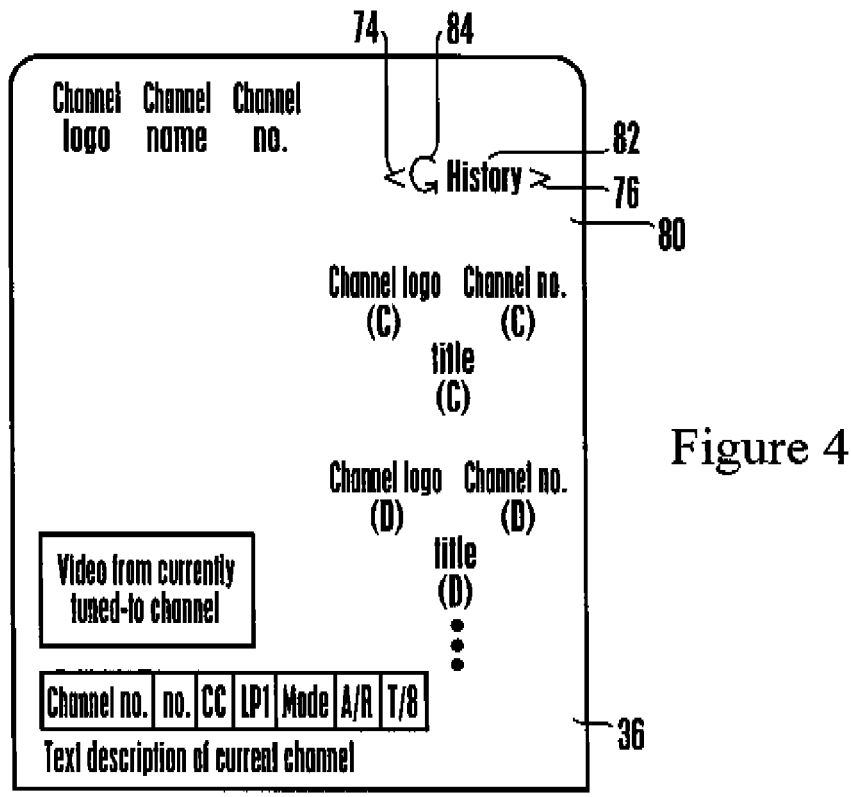
FIG. 4 is a screen shot of a user interface showing a viewer-established "history" subset of channels juxtaposed with a video pane showing video from a currently tuned-to channel.
Figure 5:
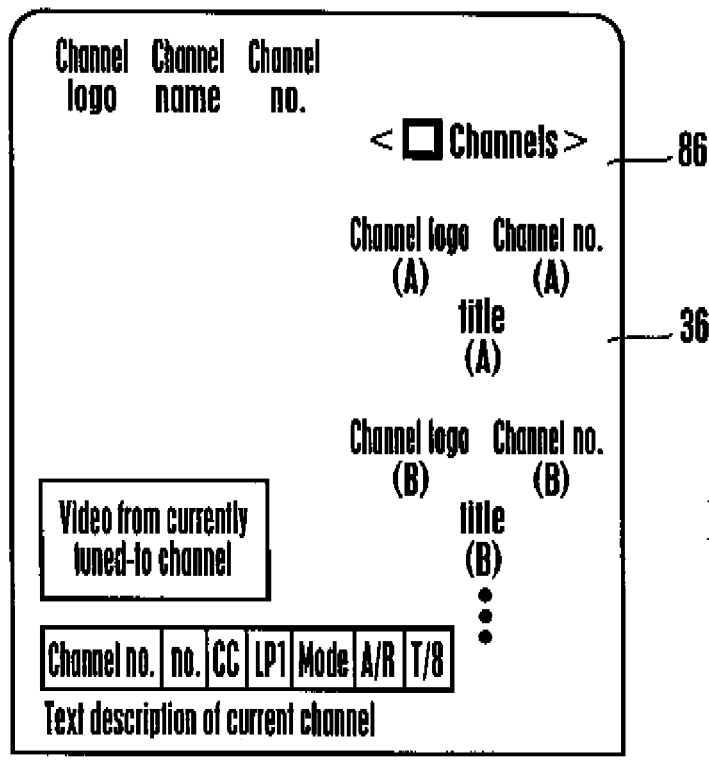
FIG. 5 is a screen shot of a user interface showing an "all channels" pane juxtaposed with a video pane showing video from a currently tuned-to channel.

Selection of, e.g., the left arrow selector 76 and/or repeated selection of the right arrow selector 78 may cause an alternate UI 80 to appear as shown in FIG. 4. The UI 80 shown in FIG. 4 presents a list of a subset of available channels for the current time slot, in this case, a list of the last "N" channels the viewer tuned to for longer than a predetermined period, e.g., ten seconds. That is, for a channel to be added to the history list, it must have been tuned to for longer than, say, ten consecutive seconds. "N" is an integer and is typically twenty or less, and as will be appreciated by the skilled artisan, the history list is established automatically in response to viewer channel selections. In any case, the UI 80 has a list title 82 and a list logo 84 as discussed above that are unique to the UI 80. Although not shown, toggling of an appropriate selector 74, 76 may present "up next" program information for the channels in the "history" list.

The selectors 74, 76 remain on the UI 80 as shown and may be selected as discussed above to cause yet another channels list to be presented by a UI 86. Unlike the UIs 40, 40a, and 80 discussed above, however, the channel UI 86 presents a list of all available channels for the current time slot, albeit not all at once.

Figure 6:
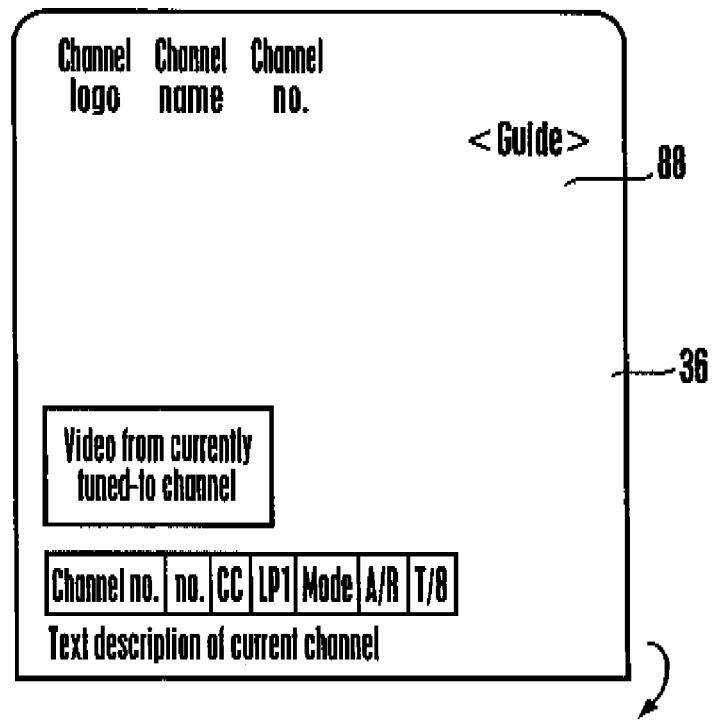
FIG. 6 is a screen shot showing a temporarily displayed "guide" pane juxtaposed with a video pane showing video from a currently tuned-to channel.
Figure 7:
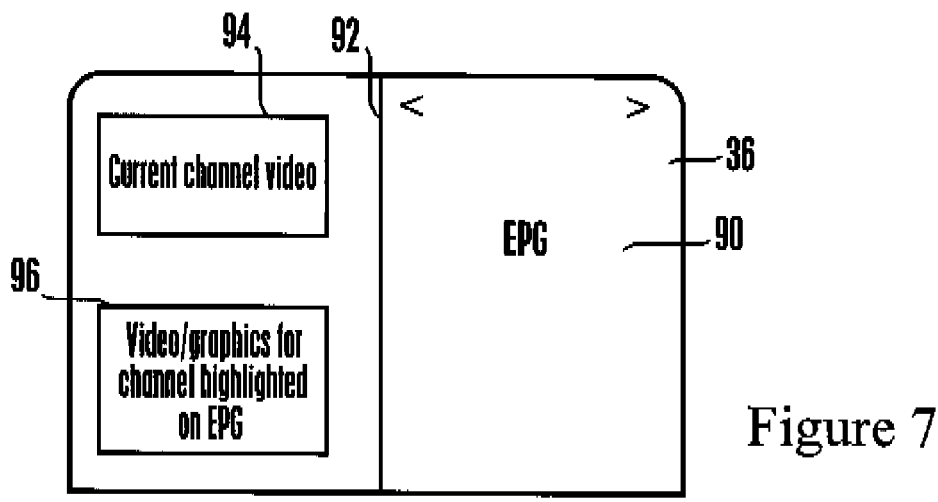
FIG. 7 is a screen shot of a user interface showing the EPG that is displayed after the "guide" pane of FIG. 6.

The channel list UI 80 is in all other essential respects identical to the previous channel listings in that a channel logo, channel number, and program title of channels in a single column are displayed next to the current video pane 42. Additional toggling of one or both of the selectors 74, 76 can cause an empty "guide" UI 88 to be momentarily displayed as shown in FIG. 6, which alerts the viewer that within a few seconds and without further viewer interaction, a matrix-like EPG 90 pane (FIG. 7) will be automatically presented. Because the EPC pane 90 may be in a conventional EPG-like matrix, in which a left-most column represents a channel and then subsequent fields in the row represent program information for succeeding time slots, the EPG pane 90 may be larger than the UIs 40, 40a, 80, 86, and 88 described above. Also, the EPG pane 90 may be separated by a visible vertical boundary line 92 from two video panes, namely, a current channel video pane 94 and a video and/or graphics pane 96 showing video and/or graphics that are associated with the channel over which the screen cursor is highlighted in the EPG pane 90.

Figure 8:
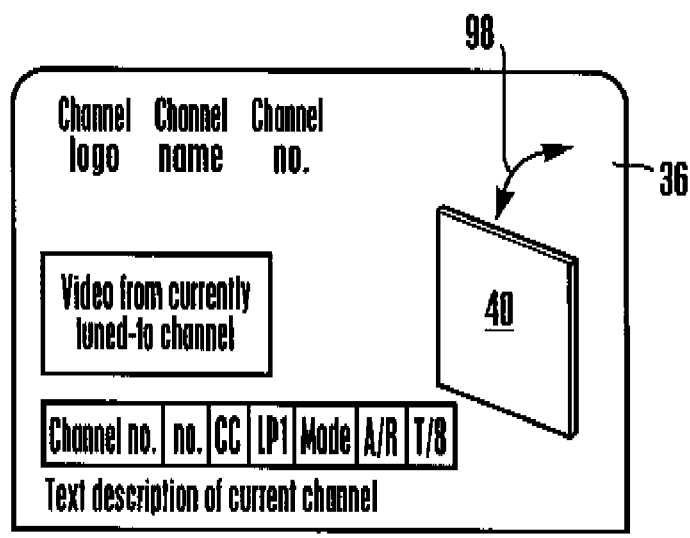
FIG. 8 is a screen shot of a user interface illustrating a graphic for transitioning between the UIs of FIGS. 2-6.

FIG. 8 illustrates that 3D graphics may be used to, e.g., indicate transitions between UIs when a selector 74, 76 is selected. For example, when transitioning from the UI 40 to the UI 80, the UI 40 may swing back like a door hinged at its right edge, as indicated by the arrow 98, to a position that appears to a viewer to be an edge view, and then immediately swing back to the frontal perspective shown in FIG. 4.

While the particular TV USER INTERFACE FOR VIEWING SELECTED SUB-GROUPS OF CHANNELS is herein shown and described in detail, it is to be understood that the subject matter which is encompassed by the present invention is limited only by the claims.

What is claimed is:

1. A method, comprising:
   displaying a current channel on a TV monitor;
   displaying a first user interface (UI) on the monitor next to the current channel; receiving a signal from a remote control device to change to a second UI; and
   using motion graphics, transitioning from the first UI to the second UI, wherein the first UI swings back hinged at its edge to a position that appears to a viewer to be an edge view, and then swings back to a frontal perspective showing the second UI.

2. The method of claim 1, wherein the first UI presents a list including channel number and program description.

3. The method of claim 2, wherein channels in the list are presented in a single column for only one time slot.

4. The method of claim 2, wherein the list is a favorite channel list defined by at least one viewer.

5. The method of claim 2, wherein the list is a history channel list showing the most recent "N" channels tuned to for longer than a predetermined period.

6. The method of Claim 2, wherein the list is a favorite channel list defined by at least one viewer and the second UI includes a history channel list showing the most recent "N" channels tuned to for longer than a predetermined period.

7. The method of claim 2, wherein the list presents all channels available to the TV for only one time slot.

8. The method of claim 7, wherein the second UI is an EPG showing program information for at least two time slots.

9. The method of claim 1, wherein the first UI is depicted to graphically swing back and then forward to a front view showing the second UI.

\* \* \* \* \*